(12) United States Patent
Zentner et al.

(10) Patent No.: US 7,386,882 B2
(45) Date of Patent: Jun. 10, 2008

(54) KEY PAD DECODER

(75) Inventors: Jeff Zentner, Rocklin, CA (US); Frederic Charlier, Rocklin, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1288 days.

(21) Appl. No.: 09/895,703

(22) Filed: Jun. 29, 2001

(65) Prior Publication Data
US 2003/0005325 A1 Jan. 2, 2003

(51) Int. Cl.
- G06F 7/04 (2006.01)
- G06F 7/58 (2006.01)
- G06F 17/30 (2006.01)
- G06K 19/00 (2006.01)
- H04L 9/32 (2006.01)
- G11C 7/00 (2006.01)

(52) U.S. Cl. .............................. 726/19; 726/7; 341/24; 341/25

(58) Field of Classification Search ............... 713/200; 341/24–25; 726/7, 19
See application file for complete search history.

(56) References Cited

U.S. PATENT DOCUMENTS

| | | | | |
|---|---|---|---|---|
| 4,247,895 A | * | 1/1981 | Weber | 434/327 |
| 5,264,845 A | * | 11/1993 | Kwon et al. | 341/26 |
| 5,285,495 A | * | 2/1994 | Wu et al. | 379/368 |
| 5,362,952 A | * | 11/1994 | Nair et al. | 235/449 |
| 5,483,685 A | * | 1/1996 | Okamura | 455/179.1 |
| 5,539,400 A | * | 7/1996 | Mears | 341/22 |
| 5,621,402 A | * | 4/1997 | Spak et al. | 341/26 |
| 5,689,247 A | * | 11/1997 | Welner | 340/5.51 |
| 5,714,983 A | * | 2/1998 | Sacks | 345/168 |
| 5,760,714 A | * | 6/1998 | Zimmerman | 341/26 |
| 5,832,206 A | * | 11/1998 | De Jesus et al. | 713/200 |
| 6,054,940 A | * | 4/2000 | Greene | 341/26 |
| 6,230,222 B1 | * | 5/2001 | Rush | 710/67 |
| 6,278,384 B1 | * | 8/2001 | Ide | 341/26 |
| 2002/0118178 A1 | * | 8/2002 | O'Conghaile et al. | 345/173 |
| 2002/0180806 A1 | * | 12/2002 | Zhang et al. | 345/816 |

* cited by examiner

*Primary Examiner*—Nasser Moazzami
*Assistant Examiner*—David Garcia Cervetti

(57) ABSTRACT

A system for determining which key of a key-pad device is activated by an algorithm that employs the same number of steps to make the determination regardless of which key is pressed. In one embodiment, the algorithm first determines if more than one key is pressed in more than one column. The algorithm then determines which key has been pressed by adding key values associated with each key on a row-by-row basis. Once the algorithm calculates the added value, it then determines whether the added key value exceeds a predetermined value to determine if more than one key has been pressed in the rows. If the added value does not exceed the predetermine value, then the added value is subtracted from another predetermined value to give the key value that is transferred from the device.

13 Claims, 2 Drawing Sheets

KEY PAD DECODER

BACKGROUND OF THE INVENTION

1. Field of the Invention

This invention relates generally to a key pad decoder for determining which key on a key-pad has been activated and, more particularly, to a key-pad decoder for determining which key on a key-pad has been activated, where the number of steps used to determine which key has been activated is the same regardless of the key pressed, so as to prevent secret information from being decoded by a potential thief.

2. Discussion of the Related Art

Personal information is sometimes used to identify an individual for various reasons, such as to complete a commercial transaction. For example, personal identification number (PIN) pads are sometimes provided at grocery store checkout lanes to allow a customer to easily pay for goods using a credit card, debit card or check. An example of such a PIN pad is the PIN pad 1000 available from Hewlett-Packard. The PIN pad allows the customer to input information relating to the particular debit or credit card being used and information about the user, such as date of birth, driver's license number and personal identification number (PIN). This information is then transmitted to a financial database, where the user's credit and financial information is accessed and verified. The PIN pad includes a key-pad through which the user can input the information, and a display for displaying the entered information and for requesting additional information by a local network computer.

FIG. 1 is a block diagram of a financial transaction system 10 employing a PIN pad 12 of the type discussed above. The PIN pad 12 includes a key-pad 14 having a plurality of keys 16 that are pressed to access and activate the PIN pad 12. Further, the PIN pad 12 includes a display 18 that displays the keys 16 activated by the user, and also displays requests for additional information to be entered by the user. Further, the PIN pad 12 includes a magnetic strip reader 20 that reads a magnetic strip on a credit card or a debit card to be entered into the PIN pad 12, as is well understood in the art.

When the user presses a key 16 on the key-pad 14, the PIN pad 12 deciphers the keystroke, and generates a signal indicative of that particular key. In known systems, the PIN pad 12 determined which key 16 had been pressed by sequentially looking at the values in a look-up table, where each value represents a particular key 16, until a match was found for that key, so that the PIN pad 12 would then know which key 16 was activated. For example, key A has a binary value associated with it, key B has another binary value associated with it, key C has another binary value associated with it, etc. If the user presses key D, the PIN pad 12 would compare the digital representation of the first number in the look-up table to the signal received to determine which key 16 was pressed. Since no match would be found, the PIN pad 12 would sequentially look at the next value in the table, and so forth, until the PIN pad 12 reached the value for key D, where a match would be found.

Once the PIN pad 12 determined which key 16, or series of keys, were pressed, it would send this information over a serial bus to a local terminal 22. The local terminal 22 would then decipher the information entered into the PIN pad 12 by the user, and possibly generate a request returned to the PIN pad 12 that would be displayed on the display 18. The user would then respond to the request through the key-pad 14 to complete the transaction. The system 10 can verify the user or the user's financial information by transferring the received information from the PIN pad 12, such as the user's PIN, to a local computer 24, which would then transmit the information to a financial institution 26, such as a bank, over the telephone lines or other connection. Therefore, the user's financial information and the like can be verified to complete the transaction.

Because the PIN pad 12 determined which key 16 was depressed by using a look-up table through a sequential matching process, unauthorized persons could gain access to a user's PIN or other private information by monitoring the time it took the PIN pad 12 to determine which key 16 was pressed by the user. For example, a potential thief could electrically couple a recording device or the like in the connection between the PIN pad 12 and the terminal 22, where the device recorded the time it took the PIN pad 12 to determine which key 16 was activated. Therefore, based on this time frame, the potential thief could then determine the PIN of the user, and could then use the acquired PIN to access the user's accounts for nefarious reasons.

SUMMARY OF THE INVENTION

In accordance with the teachings of the present invention, a system is disclosed for determining which key of a key-pad device is activated that prevents an unauthorized person from determining secret information therefrom. The key-pad device determines which key is activated by an algorithm that employs the same number of steps to make the determination regardless of which key is pressed. In one embodiment, the algorithm first determines if more than one key is pressed in more than one column. If more than one key is pressed in more than one column, the algorithm returns an error, and initiates a sub-routine that decodes multiple key presses. If the algorithm determines that only one key has been pressed in one column, the algorithm then determines which key has been pressed by adding the key values for each key pressed on a row-by-row basis. Once the algorithm calculates the added value, it then determines whether the added key value exceeds a predetermined value to determine if more than one key has been pressed in the rows. If the added value does exceed the predetermined value, then the algorithm initiates the multiple key press sub-routine. If the added value does not exceed the predetermined value, then the added value is subtracted from another predetermined value to give the key value that it is transferred from the device.

Additional objects, advantages, and features of the present invention will become apparent from the following description and appended claims, taken in conjunction with the accompanying drawings.

DETAILED DESCRIPTION OF THE EMBODIMENTS

The following discussion of the embodiments of the invention directed to a technique for determining which key of a key-pad device is activated is merely exemplary in nature, and is in no way intended to limit the invention or its applications or uses.

Figure 2:
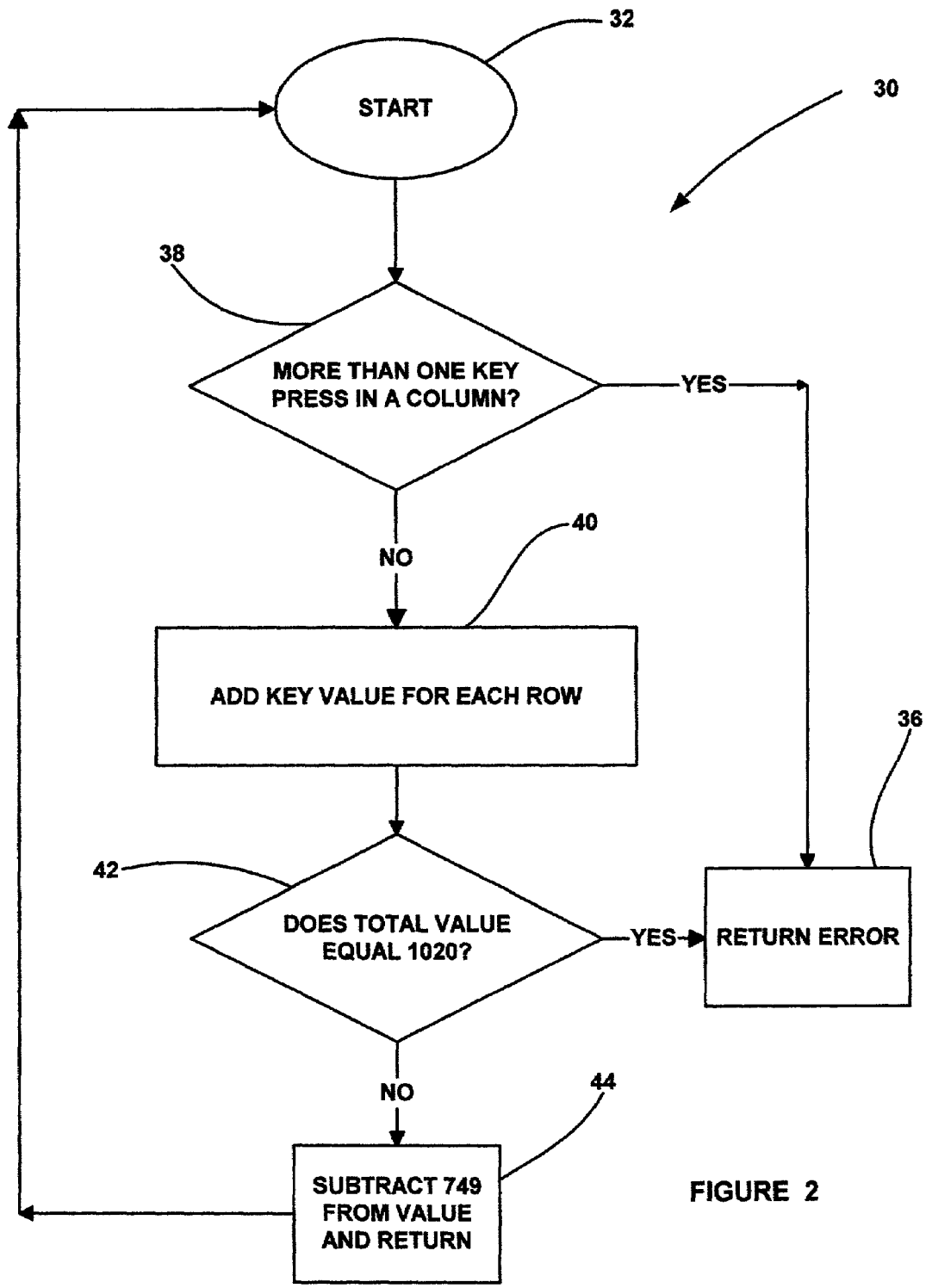
FIG. 2 is a flow chart diagram of a process for determining which key of the key-pad device is activated, according to an embodiment of the present invention.

FIG. 2 is a flow chart diagram 30 depicting the operation of a controller that employs an algorithm that allows a key press of the PIN pad 12 to be transferred to the terminal 22 as a "key value" that is read and deciphered by the terminal 22. The algorithm starts at oval 32 after certain preliminary signal conditioning steps have occurred, such as a debounce operation. As is known in the art, a debounce operation determines whether a key has been activated for a long enough period of time to register a "key press value" signal. Further, the algorithm shown in the flow diagram 30 is used for determining a single key press, and is generally not applicable as described herein for those functions that require simultaneous key presses for certain operations. Those simultaneous key press operations probably would not benefit from the present invention, but could be included in the overall system algorithm.

The algorithm first determines whether more than one key 16 is pressed in more than one column of keys, as shown by decision diamond 38. For example, each time a key is pressed, a bit for that column is set. In one example, the right most bit in a four bit word is set if a key press value is registered for the first column. If the first column registers a set bit, then a "counter" is set to one, otherwise the counter remains at zero. The next column is then read to determine if it has a set bit or not. In the example above, the bit is set in the second position in the four bit word if a key press value is received for that column. The counter is advanced one if the bit is set, otherwise the counter remains at the previous value. The same process is performed in the next two columns of keys, where the set bit moves over to the left one position in the digital word each time. The counter is then read to determine if it is greater than one. If the counter is greater than one, then more than one key 16 has been pressed in more than one column, and an error is returned as shown by box 36. The algorithm then moves to a sub-routine that decodes dual key presses.

In one non-limiting example, each key is assigned a key press value that is a hexa-decimal representation. If key #1 and key #2 are pressed at the same time, then the key press value is 0xffee. The NOT of 0xffee is ANDed with 0x000f, which is 1, so the counter is set to 1. The NOT of 0xffee is shifted to the left one, and again ANDed with 0x000f, which is 1, so 1 is again added to the counter. The NOT of 0xffee is shifted to the left two and ANDed with 0x000f, which is 0, so 0 is added to the counter. The NOT of 0xffee is shifted to the left three bits and ANDed with 0x000f, which is 0, so 0 is added to the counter. Since this is the last column of keys, the counter is set at two, which is larger than 1, so the algorithm determines that more than one key was pressed in more than one column. If only one of the two key #1 or key #2 had been pressed, then the counter would have a 1 at the end of the routine, indicating that only one key had been pressed in one column.

If the counter determines that only one key has been pressed in all of the columns, the algorithm advances to box 40 to add the key press values for all the keys 16 that are pressed. The algorithm reads each value assigned to a particular key 16 on a row-by-row basis. For example, if no key 16 is pressed in the first row of keys, then the accumulated value is zero. The algorithm then adds the key press value of any key 16 that is pressed in the next row of keys. The algorithm continues in this manner through the third and fourth row of keys, and adds all of the values of any pressed key. Therefore, the algorithm accumulates all of the values of all of the pressed keys.

Figure 1:
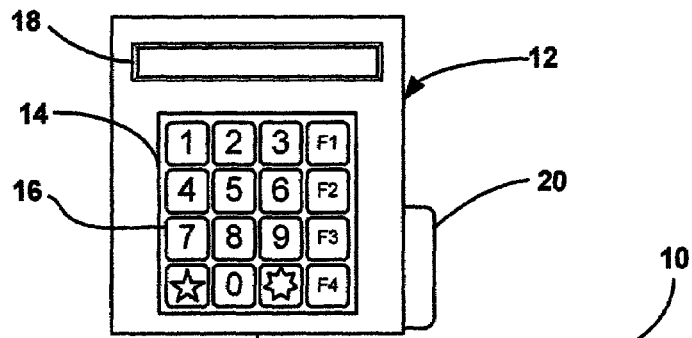
FIG. 1 is a block diagram of a financial transaction system including a key-pad device.
Figure 3:
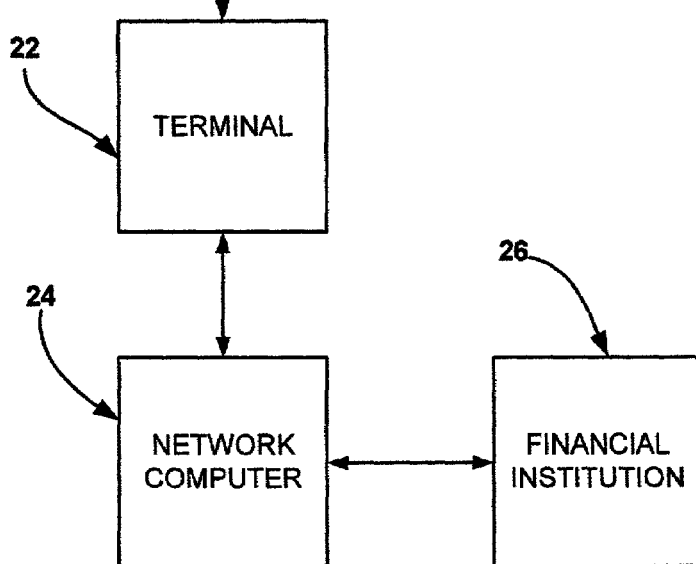
FIG. 3 is a decode table for decoding the keys in the key-pad device.

FIG. 3 is a decode table 50 including a plurality of cells 52 arranged in rows 56 labeled A-D and columns 54 labeled 0-4 as shown. The cells 52 in rows A-D and columns 0-3 provide a one to one correspondence for each of the keys 16, where each cell 52 includes a particular number represented in hexa-decimal. The column 4 is a hexi-decimal start location for each row 56 used during adding of the key press values at box 46. discussed below.

Figure 4:
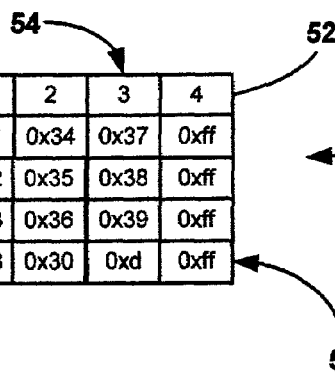
FIG. 4 is an exchange table corresponding to the decode table.

FIG. 4 is an exchange table 60 corresponding to the decode table 50. In one embodiment, the decode table 50 and the exchange table 60 are used to add the key press values on a row-by-row bases to determine a valid key value that will be transmitted to the terminal 22. It is stressed, however, that this is by way of a non-limiting example in that other techniques and digital representations of the key 16 can be employed within the teachings of the present invention.

The algorithm then determines, at decision diamond 40 if the accumulated key press value equals a predetermined value, such as 1020, representing the added value for all of the keys pressed in all of the rows, including the added key press value for those keys that aren't pressed (which will be zero). If the answer is yes, the algorithm goes to box 36 to begin the dual key press sub-routine. If the answer is no, then the algorithm subtracts a predetermined value, such as 749, from the accumulated value, at box 44 which is the key value that is transmitted to the terminal 22. Thus, the algorithm goes through the same number of steps regardless if the first key is pressed or the last key is pressed to determine the key value. Therefore, a potential thief would not be able to determine the personal information of the user of the PIN pad 12 by recording the time it takes to the PIN pad 12 to determine which key 16 is pressed.

A non-limiting example of the process conducted by the algorithm at box 40 is given below for a valid key press of key #6. At the start of the process for box 40, the key press value is 0xfbff. The algorithm takes the NOT of 0xfbff, which is 0x0400, and bit wise ANDs it with 0x000f, which is 0x0. Then, the algorithm looks up the value in the exchange table 60 that corresponds to location 0 (0x0), which is 4, and adds the value from the decode table 50 associated with location A4 to the "key value", which is 0xff. The notation A represents the first row and the notation 4 represents the value for that row. Then, the algorithm shifts 0xfbff to the right one location, which is 0xfbf, and NOTs and bit wise ANDs it with 0x000f, which is 0x0. Then, the algorithm looks up the value in the exchange table 60 that corresponds to location 0, which is 4, and adds the value from the decode table 50 associated with location B4 to the "key value", which is 0xff, so that the key value is now 0x1fe.

Next, the algorithm shifts 0xfbff to the right two locations, which is 0xfb, then NOTs and bit wise ANDs it with 0x000f, which is 0x4. Then, the algorithm looks up the value in the exchange table 60 that corresponds to location 4, which is a 2, and adds the value from the decode table 50 associated with location C2 to the key value, which is 0x36, so the key value is now 0x234. Then, the algorithm shifts 0xfbff to the right three locations, which is 0xf, and bit wise ANDs it with 0x000f, which is 0x0. Then, the algorithm looks up the value in the exchange table 60 that corresponds to location 0, which is 4, and adds the value from the decode table 50 associated with location D4 to the key value, which is 0xff, so that the key value is now 0x333. 0x2 fd is then subtracted from 0x333 which gives 0x36, which is the key value transmitted to the terminal 22.

If both key #1 and key #4 are pressed at the same time, representing an invalid operation, then the key press value at the start of the operation of box 40 is 0xfff 9. The algorithm takes the NOT of 0xfff 9, which is 0x0006, and bit wise ANDs it with 0x000f, which is 0x6. Then, the algorithm looks up the value in the exchange table 60 that corresponds to location 6, which is 4, and adds the value from the decode table 50 associated with location A4 to the key value, which is 0xff. Then, the algorithm shifts 0xfff 9 to the right one location which is 0xfff, and NOTs and bit wise ANDs it with 0x000f, which is 0x0. Then, the algorithm looks up the value in the exchange table 60 that corresponds to location 0, which is 4, and adds the value from the decode table 50 associated with the location B4 to the key value, which is 0xff so the key value is now 0x1fe.

The algorithm then shifts 0xfff 9 to the right two locations which is 0xff then NOTs and bit wise ANDs it with 0x000f, which is 0x4. Then, the algorithm looks up the value in exchange table 60 that corresponds to location 0, which is 4, and adds the value from the decode table 50 associated with location C2 to the key value, which is 0xff so the key value is now 0x2fd. Next, the algorithm shifts 0xfff 9 to the right three locations, which is 0xf, and bit wise ANDs it with 0x000f, which is 0x0. Then, the algorithm looks up the value in exchange table 60 that corresponds to location 0, which is 4, and adds the value from the decode table 50 associated with location D4 to the key value, which is 0xff so that the key value is now 0x3fc. This key value represents multiple key presses, and is not returned as a key value.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

What is claimed is:

1. A key-pad device comprising:
   a key-pad including a plurality of keys arranged in a plurality of rows and a plurality of columns; and
   a key-pad controller providing a key value signal when one of the keys is activated, said controller determining which key is activated by a process including a predetermined number of steps comprising:
   assigning each key a key press value;
   determining if a key has been pressed in one of the columns;
   advancing a counter by a counter value if a key has been pressed;
   determining if a key has been pressed in a next column and adding the counter value to the counter if a key has been pressed, otherwise keeping this counter value the same;
   adding the key press value of all the keys that had been pressed in a first row to generate a first row added key value;
   adding the key press value of all the keys that have been pressed in a second row and adding the added key press values of the second row to the added key value;
   determining whether the added key value exceeds a predetermined value;
   transferring the key value from the key-pad device, if the added key value does not exceed the predetermined value;
   comparing the added key value to a predetermined key value to determine if multiple keys had been pressed simultaneously.

2. The device according to claim 1 further comprising a display and a magnetic strip reader.

3. The device according to claim 1 wherein the controller adds a counter value to a counter if a key is activated in a column, and wherein the controller determines which column is being monitored for a key activation by a set bit in a digital word.

4. The device according to claim 1 wherein the controller determines which key has been activated on a row-by-row basis.

5. The device according to claim 1 wherein the controller subtracts the added key value from a predetermined value to calculate a key value to be transmitted.

6. A key-pad device for transferring a key value representative of a key press to a terminal, said device comprising:
   a key-pad including a plurality of keys arranged in a plurality of rows and a plurality of columns; and
   a key-pad controller outputting the key value to the terminal when one of the keys is pressed, said controller determining the key that is pressed by a process including:
   assigning each key a key press value;
   determining if a key has been pressed in one of the columns;
   advancing a counter by a counter value if a key has been pressed;
   determining if the key has been pressed in a next column and adding the counter value to the counter if a key has been pressed, otherwise keeping the counter value the same;
   adding the key press value of all the keys that have been pressed in a first row to generate a first row added key value;
   adding the key press value of all the keys that have been pressed in a second row and adding the key press values of the second row to the added key value;
   determining whether the added key value exceeds a predetermined value;
   transferring the key value from the key-pad device if the added key value does not exceed a predetermined value; and
   comparing the added key value to a predetermined key value to determine if multiple keys have been simultaneously pressed, where the number of steps is the same regardless of which key is pressed, said controller determining if more than one key has been pressed in more than one column, and then if only one key has been pressed, determining which key has been pressed on a row-by-row basis by adding the key press values for each key that is pressed, wherein the controller compares the added key press value to a predetermined value to determine if multiple keys in a column have been simultaneously pressed.

7. The device according to claim 6 wherein the controller adds a counter value to a counter if a key is pressed in a column, and wherein the controller determines that more than one key has been pressed in more than one column if the counter value in the counter is greater than a predetermined value.

8. The device according to claim 6 wherein the controller adds the key press value for each key pressed in a particular row before moving on to a next row.

9. The device according to claim 6 wherein the controller subtracts the added key value from a predetermined value to determine the key value to be transmitted to the terminal.

10. A method for determining which key of a key-pad device having a plurality of keys arranged in a plurality of rows and a plurality of columns has been pressed, comprising:

assigning each key a key press value;

determining if a key has been pressed in one of the columns;

advancing a counter by a counter value if a key has been pressed;

determining if a key has been pressed in a next column and adding the counter value to the counter if a key has been pressed, otherwise keeping the counter value the same;

adding the key press value of all of the keys that have been pressed in a first row to generate a first row added key value;

adding the key press value of all of the keys that have been pressed in a second row and adding the added key press values of the second row to the added key value;

determining whether the added key value exceeds a predetermined value;

transferring the key value from the key-pad device if the added key value does not exceed the predetermined value; and comparing the added key value to a predetermined key value to determine if multiple keys have been simultaneously pressed.

11. The method according to claim 10 wherein the keypad includes four rows and four columns, and wherein advancing the counter for each pressed key in each column is performed for all four columns, and wherein adding the key press values for all of the keys is performed for all four of the rows.

12. The method according to claim 10 further comprising subtracting the added key value from a predetermined value to calculate the key value that is transmitted.

13. The method according to claim 10 wherein determining if a key has been pressed in one of the columns includes setting a set bit for a particular column if a key has been pressed in that column.

* * * * *

UNITED STATES PATENT AND TRADEMARK OFFICE
CERTIFICATE OF CORRECTION

| | |
|---|---|
| PATENT NO. | : 7,386,882 B2 |
| APPLICATION NO. | : 09/895703 |
| DATED | : June 10, 2008 |
| INVENTOR(S) | : Jeff Zentner et al. |

It is certified that error appears in the above-identified patent and that said Letters Patent is hereby corrected as shown below:

In column 4, line 37, after "takes" delete "to".

Signed and Sealed this

Second Day of December, 2008

JON W. DUDAS
*Director of the United States Patent and Trademark Office*